United States Patent
Abu-Amara et al.

(10) Patent No.: US 6,173,183 B1
(45) Date of Patent: Jan. 9, 2001

(54) CDMA INTER-MOBILE SWITCHING CENTER SOFT HAND-OFF

(75) Inventors: Marwan Abu-Amara, Richarson; Steve Sides, Plano; Ahmad Jalali, Plano; Jyoti Boppana, Plano; Satyajit Doctor, Richardson, all of TX (US)

(73) Assignee: Northern Telecom Limited, Montreal (CA)

(*) Notice: Under 35 U.S.C. 154(b), the term of this patent shall be extended for 0 days.

(21) Appl. No.: 09/118,122

(22) Filed: Jul. 16, 1998

Related U.S. Application Data

(62) Division of application No. 08/736,625, filed on Oct. 24, 1996.

(51) Int. Cl.[7] .................................................. H04Q 7/20
(52) U.S. Cl. ........................... 455/442; 455/436; 455/426; 455/442
(58) Field of Search ............................. 455/426, 445, 455/442, 443, 436, 422; 370/328, 338, 349, 401, 311

(56) References Cited

U.S. PATENT DOCUMENTS

| | | | |
|---|---|---|---|
| 5,159,592 | * 10/1992 | Perkins | 370/401 |
| 5,168,498 | * 12/1992 | Adams et al. | 370/349 |
| 5,432,841 | * 7/1995 | Rimer | 455/457 |
| 5,526,400 | * 6/1996 | Nguyen | 455/432 |
| 5,530,693 | * 6/1996 | Averbuch et al. | 370/331 |
| 5,530,963 | * 6/1996 | Moore et al. | 709/243 |
| 5,544,222 | * 8/1996 | Robinson et al. | 455/557 |
| 5,572,528 | * 11/1996 | Shuen | 370/402 |
| 5,754,547 | * 5/1998 | Nakazawa | 370/401 |
| 5,771,459 | * 6/1998 | Demery et al. | 455/517 |
| 5,822,309 | * 10/1998 | Ayanoglu et al. | 370/315 |
| 5,854,982 | * 12/1998 | Chambers et al. | 455/445 |
| 5,930,714 | * 7/1999 | Abu-Amara et al. | 455/442 |
| 6,064,722 | * 5/2000 | Clise et al. | 379/37 |

* cited by examiner

*Primary Examiner*—Dwayne D. Bost
*Assistant Examiner*—Sonny Trinh
(74) *Attorney, Agent, or Firm*—John D. Crane

(57) ABSTRACT

The present invention facilitates an inter-mobile switching center (MSC) soft hand-off by creating a communication link between the MSCs through the base station controllers (BSCs). The routers in the BSCs are linked to form a virtual router. This faster link between the BSCs enables the same protocol to be used for intra-MSC soft hand-off used for inter-MSC soft hand-off.

2 Claims, 5 Drawing Sheets

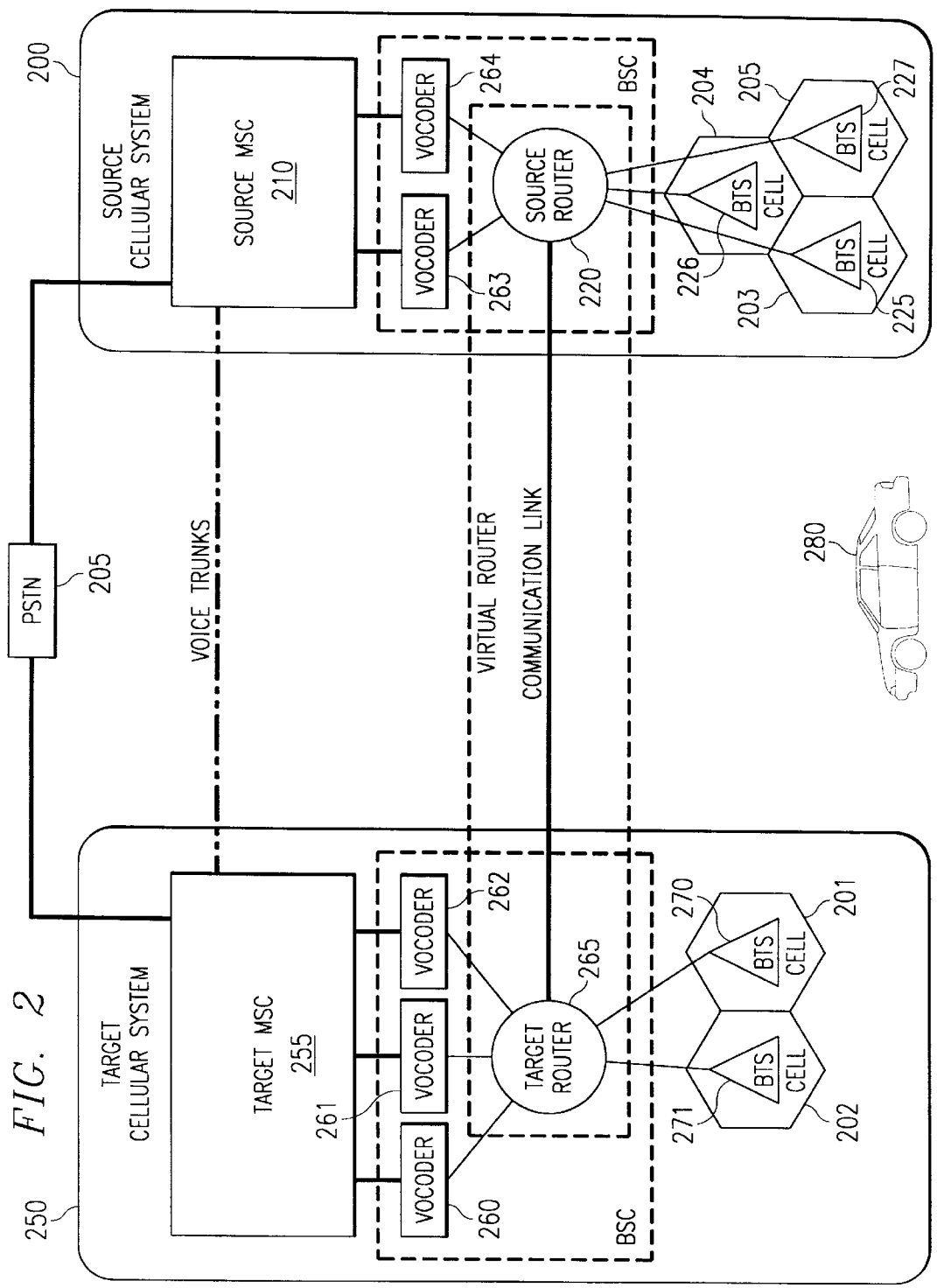

CDMA INTER-MOBILE SWITCHING CENTER SOFT HAND-OFF

This is a 37 CFR § 1.53(b) divisional of U.S. application Ser. No. 08/736,625 filed Oct. 24, 1996.

BACKGROUND OF THE INVENTION

I. Field of the Invention

The present invention relates to radio communications. More particularly, the present invention relates to code division multiple access (CDMA) cellular radiotelephone systems.

II. Description of the Related Art

A typical prior art radiotelephone system is illustrated in FIG. 1. This system is comprised of multiple cells covering a geographic region. For clarity, this figure shows only cell A and cell B. The cells are coupled to a mobile switching center (MSC) that routes the calls from the cells to the public switched telephone network (PSTN). The MSC also routes the calls from the PSTN to the appropriate cells communicating with the radiotelephone.

The system may have multiple MSCs, each handling a number of cell sites. The MSCs are linked by voice and signaling trunks. The signaling communication lines can be either a direct link or a network of communication links that introduces a substantial delay on the order of seconds.

In this system, three communication links must be established in order for a radiotelephone to communicate with the public switched telephone network (PSTN). A radio link is first established between the radiotelephone (100) and the base station (105). Next; a link (110) between the base station (105) and the mobile switching center (115) is established. Lastly, the MSC (115) forms a link with the PSTN (120).

As the radiotelephone moves from cell A's coverage area to cell B's coverage area, the radio link between the radiotelephone and cell A becomes weak. Since the radiotelephone is moving into cell B's area, the radiotelephone establishes a new communication path to the PSTN to prevent dropping of the call. The three links described above must now be set up through cell B. The process of moving from one cell to another without dropping the call is referred to in the art as a hand-off.

In code division multiple access (CDMA) cellular systems, this hand-off is typically accomplished as a soft hand-off. A soft hand-off enables the radiotelephone to move from communicating with cell A to communicating with cell B without losing contact with cell A.

In CDMA systems, each cell transmits a unique pilot signal that identifies the cell to the radiotelephone. When the radiotelephone is communicating with cell A, it is continuously monitoring pilot A as well as other pilot signals from neighboring cells, such as cell B. CDMA systems in general and pilot signals in particular are described in Telecommunications Industry Association/Electronic Industry Association Interim Standard—95A (TIA/EIA IS-95A).

As the radiotelephone moves away from the coverage of cell A, the strength of pilot B increases while the strength of pilot A decreases. The radiotelephone continues to monitor pilot A as long as the pilot remains above a predetermined threshold defined in IS-95A.

If the strength of pilot B exceeds a certain threshold, the radiotelephone sends a Pilot Strength Measurement Message to cell A, as described in IS-95A, indicating that the radiotelephone wishes to establish a radio link with cell B. Cell A forwards the message to the MSC so that the MSC knows to allocate another path from the radiotelephone to the PSTN. After the path is allocated, the radiotelephone is directed to communicate with cell B.

The radiotelephone, however, does not stop communicating with cell A unless pilot A has dropped below the minimum strength threshold. While the radiotelephone is communicating with both cells A and B, the cells forward the signal received from the radiotelephone to the same MSC. The MSC picks the best received signal and transforms the signal to a PSTN compatible signal in the pulse code modulated (PCM) format and directs the PCM signal to the PSTN. Signals received by the MSC from the PSTN are handled in a similar, reverse manner.

When the radiotelephone has moved away from cell A so that pilot A has dropped below the minimum threshold, the radiotelephone breaks communication with cell A. The radiotelephone, however, remains in contact with the PSTN through cell B. This is referred to in the art as an intra-MSC soft hand-off since the same MSC is used by both cells.

A problem exists when cell A uses one MSC and cell B uses a different MSC. In this case, due to the time delay introduced by the signaling communication network between the MSCs, the inter-MSC soft hand-off is prevented from occurring reliably and, therefore, increases the chance that the call will be dropped when the radiotelephone changes from one cellular system containing the initial MSC to another cellular system containing the other MSC. There is a resulting unforeseen need for a system that performs a reliable, inter-MSC soft hand-off.

SUMMARY OF THE INVENTION

The process of the present invention encompasses the soft hand-off of a radiotelephone from one cellular system, the source cellular system, to another cellular system, the target cellular system. Each cellular system is comprised of a mobile switching center, a base station controller, and a number of base transceiver systems. Each base station controller is comprised of a router and a number of vocoders. The radiotelephone initially communicates with the public switched telephone network (PSTN) through one mobile switching center.

A communication link connecting the base station controllers of the two cellular systems facilitates the inter-mobile switching center soft hand-off. This is accomplished by first assigning router address groups to the source and target entities that are connected to the source and target routers, respectively. The source and target routers are then connected by a communication link.

The router port connecting the source router to the target router is assigned the target router address group. The router port connecting the target router to the source router has the source router address group. When the source router receives a packet intended for the target base transceiver system, it forwards the packet to the port connecting the source router to the target router. The target router receives the packet and, based on the destination address, forwards the packet to the target base transceiver system.

The present invention enables the source and target routers to operate as one virtual router. This permits the existing signaling protocol software, used in an intra-mobile switching center soft hand-off, to be used for inter-mobile switching center soft hand-offs.

BRIEF DESCRIPTION OF THE DRAWINGS

FIG. 2 shows a block diagram of the radiotelephone system of the present invention.

DETAILED DESCRIPTION OF THE PREFERRED EMBODIMENT

Figure 1:
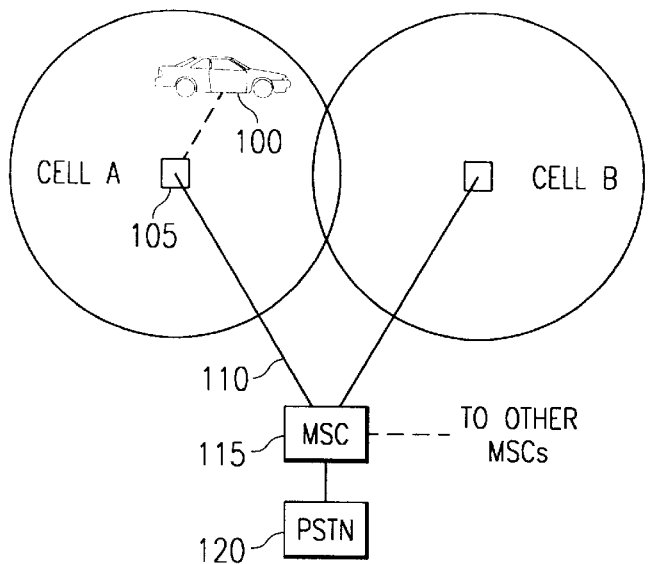
FIG. 1 shows a block diagram of a typical prior art cellular system.

The system and process of the present invention enables a radiotelephone to be handed-off between two cells that have different mobile switching centers (MSCs). By providing a communication link between the base station controllers (BSCs), the signal that is received by both cells from the radiotelephone can be compared. Thus, the best signal can be chosen for use by the system.

FIG. 2 illustrates a diagram of the cellular radiotelephone system of the present invention. The radiotelephone system is comprised of multiple cellular systems covering a geographical region. In the interest of clarity, FIG. 2 illustrates only two such cellular systems (200 and 250).

Each cellular system (200 and 250) of the preferred embodiment is comprised of an MSC (210 and 255), a BSC, and a number of base transceiver systems (BTS) (225–227, 270, and 271). Each BSC is comprised of at least one vocoder (260–264) and a router (220 and 265). In the preferred embodiment, each BSC has a number of vocoders (260–264).

In the subsequent discussion, the cellular system initially communicating with the radiotelephone is referred to as the source system (200) and the cellular system to which the radiotelephone is to be handed-off is the target system (250). Each entity of each of the cellular systems, therefore, is referred to as the source MSC or target MSC, source vocoder or target vocoder, etc.

In the preferred embodiment, the MSCs (210 and 255) are coupled to the PSTN through a T1 line that is well known in the art. The T1 line is a North American standard signal line. This signal line conducts a pulse code modulated (PCM), 24 channel, serial signal between the PSTN and the MSC. Alternate embodiments use other signal lines to couple the MSCs to the PSTN.

The MSCs (210 or 255) perform switching of a call from the PSTN to the appropriate cellular system and vice versa. The MSCs also validate the subscriber radiotelephone to determine if that subscriber is a resident of the system or a roamer. In the preferred embodiment, the MSCs each control a number of cells.

The vocoders (260–264) transform signals from one type of digital representation to another. For example, the vocoder transforms a 64 kbps pulse-code modulated speech signal to a lower rate signal such as 13 or 8 kbps. Vocoders are discussed in greater detail in IS-96A and are well known in the art.

The routers (220 and 265), well known in the art, are comprised of multiple input/output ports, each port being assigned an address range. A router (220 or 265) receives a data packet on an input port that is coupled to another entity in the cellular system. The router interprets the destination address embedded in the packet and directs the data packet to one of its output ports based on this address.

The source router (220) dedicates at least one port for every possible target router in the radiotelephone system. The possible target routers are those routers in the neighboring cellular systems. The system of the present invention couples routers, through their input/output ports, of each BSC with a communication link that enables the routers to communicate. The inter-router link provides a much faster communication link than using the inter-MSC network link.

The BTSs (225–227, 270, and 271) are the cell site equipment used to communicate with the radiotelephone. FIG. 2 illustrates three source BTSs and two target BTSs. However, other embodiments use other quantities of BTSs for the source and target systems.

In the preferred embodiment, the BSC is separate from the MSC. Alternate embodiments use MSCs with integral vocoders and routers.

Figure 6:
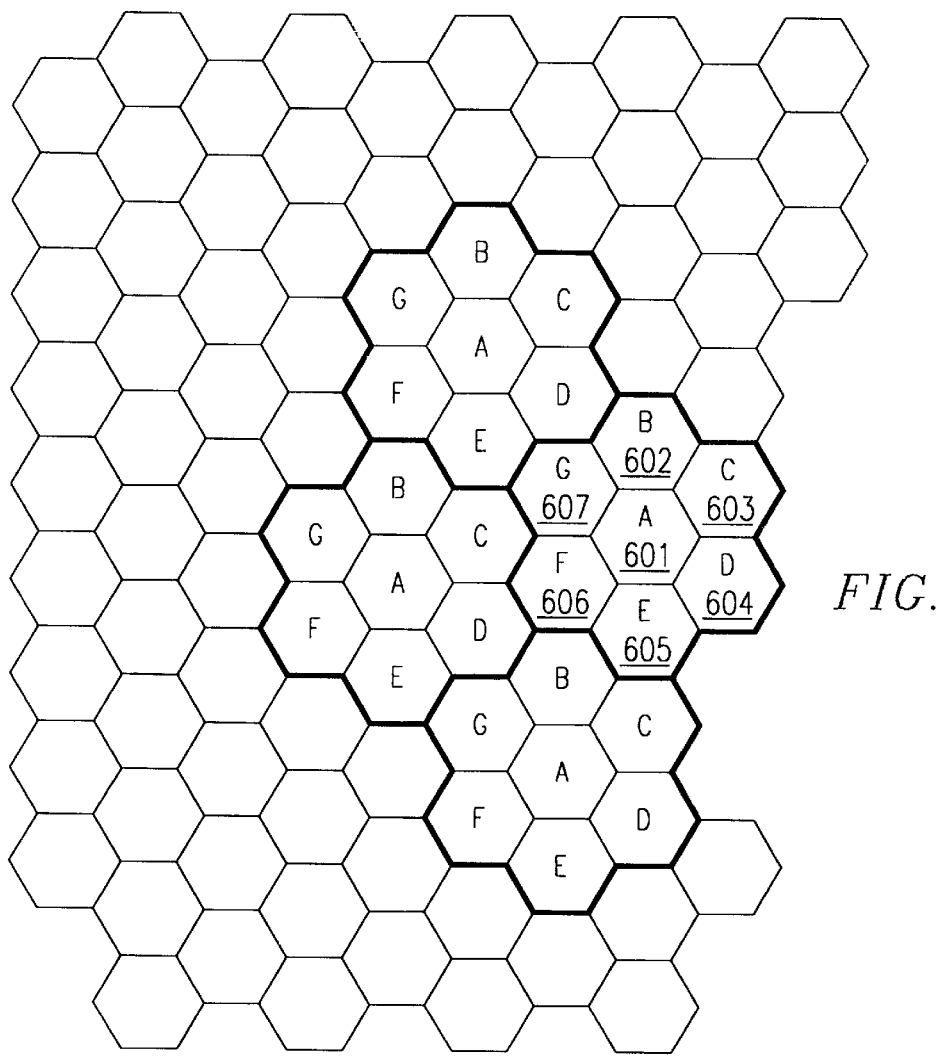
FIG. 6 shows a source cellular system and its neighboring cellular systems.

FIG. 6 illustrates a source cellular system (601) and its neighboring cellular systems (602–607). In the preferred embodiment, there are six neighboring cellular systems (602–607). Alternate embodiments have other quantities of neighboring systems.

FIG. 6 also illustrates that the available addresses for router ports are distributed in a certain reuse pattern throughout the radiotelephone system. The router port addresses are grouped into router address groups that are each labeled with a designator A through G. Each recurrence of a particular letter is a reuse of the same router address group.

In the preferred embodiment, the radiotelephone system is an N=7 system indicating that seven router address groups are used before the groups are reused. The concept of router address groups reuse is similar to the frequency reuse plan found in U.S. Pat. No. 5,483,667 to Faruque, assigned to Northern Telecom Limited and incorporated herein by reference.

FIG. 2 illustrates the various connections of the entities within each source and target cellular system. Within the source cellular system (200), the PSTN (205) conducts a signal to the MSC (210) that switches the signal to the appropriate source BTS, depending on which BTS is being used by the radiotelephone.

A source vocoder (264) takes the signal from the MSC (210) and transforms it to a lower bit rate signal. The router (220) takes the vocoded signal and routes it to the appropriate destination BTS (225–227), based on the address, from the vocoder, in the received signal. Note that if the radiotelephone is in soft hand-off with multiple source BTSs, the vocoded signal is routed to all of the source BTSs that are involved in the soft hand-off.

If the signal is sent, for example, to the source BTS (225), the BTS (225) transmits the signal to the radiotelephone (280). Signals received from the radiotelephone (280) are routed in a similar, reverse manner.

When the radiotelephone is moving from one cell, such as the source cell (203), to another cell, such as the target cell (201), it must be handed-off before the call is lost. The present invention enables this process to occur when the cells (201 and 203) are connected to different MSCs (210 and 255), as illustrated in FIG. 2.

The present invention performs inter-MSC hand-off even if the radiotelephone is moving from multiple source cells (203–205) to multiple target cells (201 and 202). In the interest of clarity, however, the subsequent discussion only shows the embodiment of the radiotelephone moving from one cell connected to one MSC to another cell connected to another MSC. The multiple target and source cells embodiment is performed in the same manner as the preferred embodiment of single target and source cells.

The source BTS (225) and the target BTS (270) are the cell site equipment for the source cell (203) and the target cell (201) respectively. The following discussion does not distinguish between the cells (201 and 203) and their corresponding BTSs (270 and 225).

To facilitate a soft hand-off between the two BTSs (225 and 270), it is important to be able to route the signal received by an entity, such as the source vocoder (264), from the source MSC (210) to the two BTSs (225 and 270). Similarly, it is important to be able to route the signal sent by the radiotelephone (280) and received by the two BTSs (225 and 255) to the same vocoder, such as vocoder (264).

The present invention provides a soft hand-off when the two BTSs (225 and 270) are connected to different MSCs (210 and 255), as illustrated in FIG. 2. The present invention facilitates the soft hand-off through two primary steps.

Figure 5:
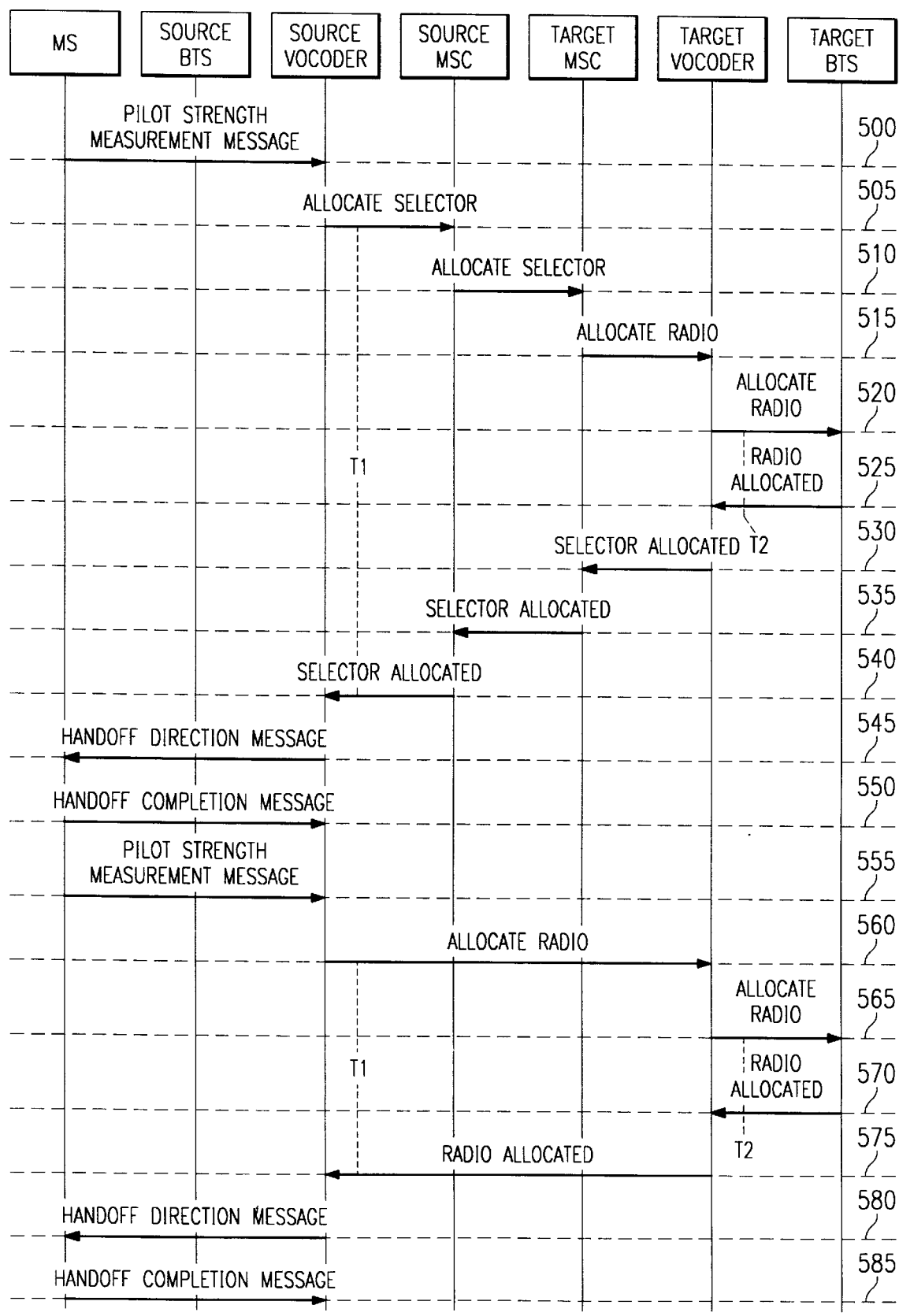
FIG. 5 shows a message flow of another alternate embodiment process.

First, the router address groups reuse pattern, shown in FIG. 5, is used to assign different router address groups to the source and target entities that are connected to the source and target routers, respectively. For example, the router address group A (501) is assigned to the source entities that are connected to the source router (220). The router address group B (502) is assigned to the target entities that are connected to the target router (265).

Each source entity that is connected to the source router is assigned an address that belongs to the router address group A. For example, the source vocoder (264) can be assigned the address $A_1$, where $A_1$ belongs to the router address group A. Similarly, each target entity that is connected to the target router is assigned an address that belongs to the router address group B. For example, the target BTS (270) can be assigned the address $B_1$, where $B_1$ belongs to the router address group B.

The second step is to connect the source and the target routers by a communication link. The port connecting the source router to the target router is then configured with the address range of the router address group B. The port connecting the target router to the source router is configured with the address range of the router address group A.

With these two steps, the source vocoder (264), for example, can send a packet to the target BTS (270) by setting the destination address of the packet to the address, $B_1$, that was assigned to the target BTS. In this example, only the port connecting the source router (220) to the target router (265) is configured to have the address range of the router address group B. Therefore, when the source router receives the packet, the source router forwards the packet to the port connecting the source router to the target router. Hence, the target router receives the packet and, based on the destination address, forwards the packet to the target BTS (270). Packets sent from the target BTS to the source vocoder are routed in a similar, reverse manner.

As seen above, the present invention causes the source router and the target router to operate as one virtual router. Thus, the inter-MSC soft handoff operates as an intra-MSC soft hand-off allowing the existing signaling protocol software, used in intra-MSC soft hand-off, to be used for an inter-MSC soft hand-off. In this manner, the cost of implementing the present invention is substantially reduced.

Furthermore, the inter-router link provides a much faster communication link than using the inter-MSC network link. Hence, the execution of the inter-MSC soft hand-off over the virtual router is significantly faster than the execution of the inter-MSC soft hand-off over the inter-MSC network link.

Figure 3:
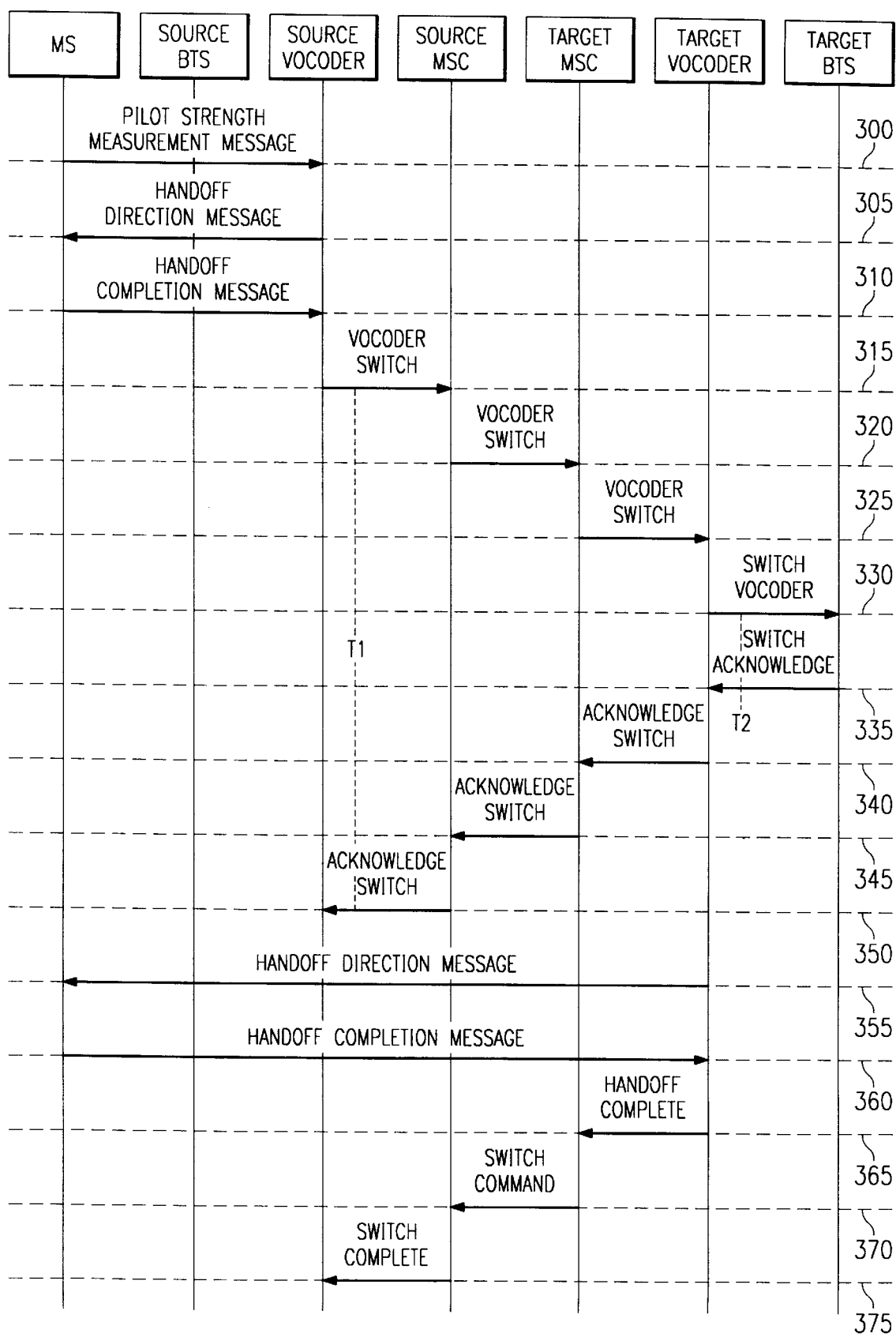
FIG. 3 shows a message flow of the process of the present invention.

After a successful inter-MSC soft hand-off, if the radiotelephone desires to drop the last remaining source BTS from the active list, then the radiotelephone uses the process of the present invention illustrated in FIG. 3.

This message flow shows the various actions and reactions from the source and target entities to drop the source BTS.

The process begins with the radiotelephone sending a pilot strength measurement message to the source vocoder (300). This message indicates the radiotelephone's desire to drop the source BTS. The source vocoder transmits a hand-off direction message to the radiotelephone (305) directing it to drop the source BTS. Even though it is dropped from the active communication list, the BTS may remain on the radiotelephone's neighboring cell list, as specified in IS-95A.

After the radiotelephone complies with the hand-off direction message, the radiotelephone sends a hand-off completion message to the source vocoder (310). This message indicates that the source BTS has been dropped from the active list.

The source vocoder then sends a vocoder switch message to the source MSC (315) informing it that an inter-MSC vocoder switch is required. The vocoder switch message contains fields for the addresses of the radio elements that the target vocoder should use, the Walsh codes of the specified radio elements, and the suggested CDMA system time that the vocoder switch should occur. A Walsh code is a unique code assigned to each radiotelephone that is communicating with the BTS and is discussed in detail in IS-95A.

The source vocoder starts a timer (315), subsequently referred to as Timer1. This timer is used to verify that a response is received within a predetermined length of time.

The source MSC passes the vocoder switch message, received from the source vocoder, to the target MSC (320). The target MSC allocates a target vocoder and transmits the vocoder switch message to that target vocoder (325). The vocoder switch message contains all of the information that was transmitted from the source vocoder above.

The target vocoder then transmits a switch vocoder message to the target BTS(s) (330). This informs the target BTS(s) about the suggested CDMA system time at which the vocoder switch will occur. This message also includes the address of the target vocoder. The target BTS(s) acknowledges the time of vocoder switching by sending a switch acknowledge message to the target vocoder (335).

When the switch vocoder message is transmitted, the target vocoder starts a timer (330) subsequently referred to as Timer2. As with Timer1, Timer2 is used to verify that a response is received within a predetermined length of time.

After the target vocoder receives the switch acknowledge message from the target BTSs, the target vocoder stops Timer2. If the switch acknowledge message was received in less than 1 second, in the preferred embodiment, it is a valid response. Alternate embodiments use other time thresholds for Timer2. If a response is not received prior to the time threshold, the process is aborted.

Upon receiving the switch acknowledge message from all target BTSs, the target vocoder sends an acknowledge switch message to the target MSC (340) confirming that the target vocoder will become the controlling vocoder.

The target MSC allocates a voice trunk upon receiving the acknowledge switch message from the target vocoder. The target MSC then sends an acknowledge switch message to the source MSC (345) informing it that the time of vocoder switching has been agreed upon.

The source MSC then informs the source vocoder (350) that the time of vocoder switching has been agreed on. At this point, the source vocoder stops Timer1 (350). If the source MSC responded back within 10 seconds, in the preferred embodiment, it is a valid response. Alternate embodiment use other time thresholds for Timer1. If a response is not received prior to the time limit, the process is aborted.

At the specified CDMA system time for switching vocoders, the target vocoder transmits a hand-off direction message to the radiotelephone (355) to reset layer 2, as described in IS-95A. The target vocoder also resets the hand-off direction message sequence number and checks layer 3 communications with the radiotelephone, as described in IS-95A. The radiotelephone's active set of cell sites does not change.

The radiotelephone transmits a hand-off completion message back to the target vocoder (360). This indicates that the hand-off directions have been completed by the radiotelephone. At this point, the target vocoder transmits a hand-off complete message to the target MSC (365) indicating that the target vocoder is now in control of the call. This message also indicates that the radiotelephone is now communicating directly with the target vocoder instead of the source vocoder.

The target MSC next sends a switch command to the source MSC (370). This switch command directs the source MSC to switch the PSTN trunk to the allocated voice trunk. This enables the target MSC to communicate with the PSTN through the source MSC.

The source MSC, upon receiving the switch command from the target MSC, switches the PSTN trunk to the allocated voice trunk. The source MSC then transmits a switch complete message to the source vocoder (375). This message informs the source vocoder to release any call related vocoder resources.

In the preferred embodiment, the source MSC is used to interface the target MSC with the PSTN after the hand-off. This saves time and signaling overhead in setting up the target MSC to handle the source MSC's tasks.

Furthermore, in the preferred embodiment, it can be seen that the source vocoder remains in charge of the current call until the radiotelephone sends a signal indicating that it wishes to drop the remaining source BTS from the active list. At this point, the source vocoder initiates the vocoder switching procedures.

Figure 4:
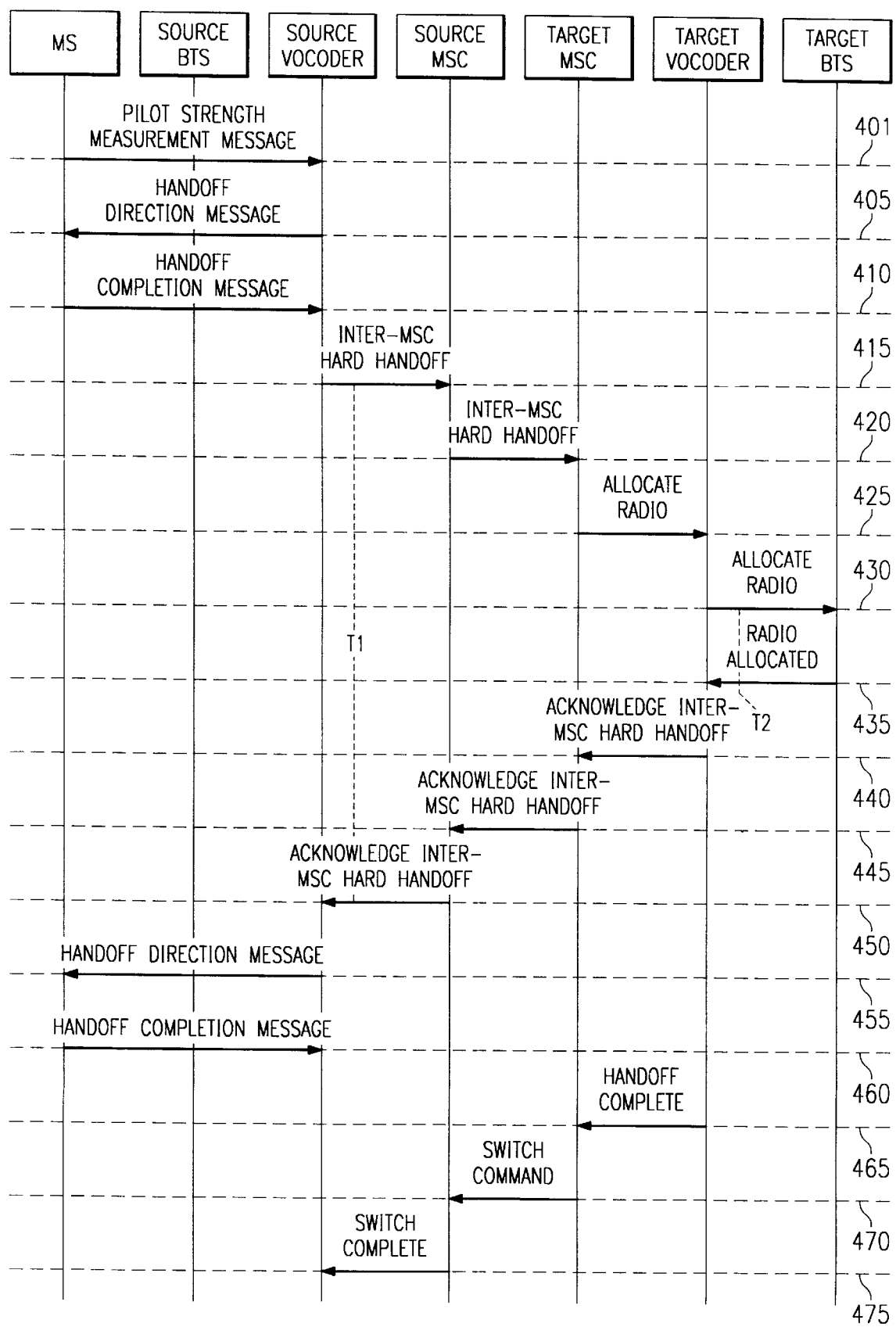
FIG. 4 shows a message flow of another alternate embodiment process.

Another alternate embodiment of the process of the present invention, illustrated in FIG. 4, shows how to drop the source vocoder using the inter-MSC hard hand-off procedure. This process combines the inter-MSC soft hand-off process with an inter-MSC hard hand-off process. The inter-MSC hard hand-off process is explained in greater detail in EIA/TIA IS-95A and EIA/TIA IS-41C.

In this alternate embodiment, the source vocoder remains in charge of the current call until the radiotelephone sends a signal indicating that it wishes to drop the remaining source BTS from the active list. At this point, the source vocoder initiates the inter-MSC hard hand-off procedures. Note that the protocol between the source MSC and the target MSC can be an IS-41 standard protocol or any other protocol.

Referring to FIG. 4, the process begins with the radiotelephone sending a pilot strength measurement message to the source vocoder (401). This message indicates the radiotelephone's desire to drop the source BTS. The source vocoder transmits a hand-off direction message to the radiotelephone (405) directing it to drop the source BTS. Even though it is dropped from the active communication list, the BTS may remain on the radiotelephone's neighboring cell list, as specified in IS-95A.

After the radiotelephone complies with the hand-off direction message, the radiotelephone sends a hand-off completion message to the source vocoder (410). This message indicates that the source BTS has been dropped from the active list.

The source vocoder next sends a hard hand-off message to the source MSC informing the MSC that an inter-MSC hard hand-off is needed (415). This message includes fields for Walsh codes and the pilot codes of the target BTSs with which the radiotelephone is currently in communication. The source vocoder also starts Timer1 at this time.

The source MSC then passes the hard hand-off message on to the target MSC (420). The target MSC allocates a target vocoder and sends an allocate radio message to the target vocoder (425).

The target vocoder sends an allocate radio message to the target BTS (430). This instructs the BTS to allocate a radio resource or resources to which the radiotelephone will tune. The allocate radio message also contains the address of the target vocoder. The target vocoder also starts Timer2 at this time.

The target BTS acknowledges the allocation of the radio (s) (435). This is accomplished by the BTS sending a radio allocated message to the target vocoder.

Upon receiving the radio allocated acknowledgment from all of the target BTSs, the target vocoder transmits an acknowledge inter-MSC hard hand-off message to the target MSC (440). This confirms that the target vocoder will become the controlling vocoder.

The target MSC then allocates a voice trunk upon receiving the acknowledge message from the target vocoder. The target MSC transmits an acknowledge inter-MSC hard hand-of message to the source MSC (445).

The source MSC sends an acknowledge inter-MSC hard hand-off message to the source vocoder (450). This message informs the source vocoder that a target vocoder and target radio(s) have been allocated. The source vocoder stops Timer1 at this time.

The time from Timer1 is compared to the predetermined time threshold of 10 seconds to determine if the response is valid. If the response was not received within the predetermined time threshold, the process is aborted.

Upon receiving the inter-MSC hard hand-off acknowledge from the source MSC, the source vocoder sends a hand-off direction message to the radiotelephone (455). This message directs the radiotelephone to tune to the newly allocated target radio frequency or frequencies.

The radiotelephone then sends back, to the source vocoder, a hand-off completion message (460). This message indicates that the radiotelephone has complied with the retuning to the new frequencies and the inter-MSC hard and-off has been completed.

Upon detecting the presence of the radiotelephone in the target cellular system, the target vocoder sends a hand-off complete message to the target MSC (465). This message indicates that the target vocoder is now in control of the call.

The target MSC directs the source MSC to switch the PSTN trunk to the allocated voice trunk by sending a switch command message (470). Upon receiving this message, the source MSC switches the PSTN trunk to the allocated voice trunk and sends a switch complete message to the source vocoder to release any call related vocoder resources (475).

It can be seen that the radiotelephone is able to perform an inter-MSC soft hand-off with multiple target BTSs, the source vocoder remaining in charge of the current call as long as the radiotelephone is communicating with at least one source BTS. For example, if the radiotelephone (280) in FIG. 2 is in soft hand-off with two target BTSs (270 and 271) and one source BTS (225), the source vocoder (264) remains in charge of the current call as long as the radiotelephone is communicating with the source BTS (225).

There are two options for sending packets between the source vocoder and the target BTSs. In the first option, the source vocoder sends a packet, over the inter-router communication link, to every target BTS (270 and 271) in the active list of the radiotelephone. The source vocoder also receives a packet, over the inter-router communication link, from every target BTS (270 and 271) in the active list of the radiotelephone. This option is employed in the two embodiments described earlier.

The second option, that is an alternate embodiment of the process of the present invention, employs the allocation of a target vocoder. This option uses the selector portion of the allocated target vocoder to send packets between the source vocoder and the target BTSs.

The selector is an entity in the vocoder that receives data packets associated with the same call that a radiotelephone is making from multiple target BTSs. The selector selects the best packet from among the received packets and forwards this packet to the source vocoder. The selector also receives a data packet from the source vocoder and distributes the packet to the multiple target BTSs.

When the radiotelephone is communicating with several target BTSs, each of these BTSs must forward the traffic and signaling to the source vocoder over the communication link interconnecting the source and target routers (and vice versa). Thus, to reduce the traffic over this communication link, the inter-MSC selector allocation procedure is performed as illustrated in FIG. 5.

For this procedure, the source vocoder remains in control of the current call for the duration of the call. Also, the source vocoder requests from the target system to allocate a selector within a target vocoder. For each voice data packet that the source vocoder receives from the PSTN, the source vocoder forwards only one packet to the allocated selector over the communication link. The selector then distributes the packet it receives from the source vocoder to each target BTS with which the radiotelephone is communicating.

Similarly, when each target BTS with which the radiotelephone is communicating forwards a packet to the source vocoder, the selector chooses the best packet from among the received packets from the target BTSs. The selector then forwards only the best packet to the source vocoder over the communication link.

The selector allocation procedure also eliminates the need for voice trunks between two MSCs. In this embodiment, a T1 line is used to interconnect the source and target routers. A High-level Data Link Control (HDLC), an international standard for data link control protocol, transports packets between the source and target routers. Also, the maximum packet size is 48 octets and the source vocoder is a 9.6 kbps vocoder with about 50% of speech activity.

With these assumptions, it can be determined that the T1 line can carry about 127 calls. If the same T1 line is used for voice trunks between the two MSCs, the maximum calls that the T1 can carry is 24. Therefore, by using the inter-MSC selector allocation procedure, a T1 carries about five times the amount of calls than the same T1 used as a voice trunk between the two MSCs.

Referring to FIG. 5, the radiotelephone first transmits the pilot strength measurement message to the source vocoder indicating that the radiotelephone wishes to add a target BTS (500). The source vocoder transmits an allocate selector message to the source MSC (505) that informs the source MSC that an inter-MSC selector allocation is needed.

The allocate selector message contains multiple fields. These fields include the Walsh codes and the pilot code of the target BTS with which the radiotelephone wishes to communicate. At this point, the source vocoder starts Timer1.

The source MSC passes, to the target MSC, the allocate selector message received from the source vocoder (510). The target MSC allocates a target vocoder and a selector within the target vocoder. The target MSC then sends the allocate radio message, containing all the information received from the source vocoder, to the target vocoder (515).

The target vocoder transmits an allocate radio message to the target BTS (520) so that the target BTS allocates a radio resource to which the radiotelephone can communicate. The message contains the address of the target vocoder. The target vocoder now starts Timer2.

The target BTS acknowledges the allocation of a radio by sending a radio allocated message to the target vocoder (525). Upon receiving the radio allocated message, the target vocoder stops Timer2 and checks to determine if the response was received in time. If the response was not received in time, the process is aborted.

The target vocoder then sends a selector allocated message to the target MSC (530). This confirms that the target vocoder has allocated a selector and that the target BTS has allocated a radio.

The target MSC sends a selector allocated message to the source MSC (535) confirming that a target vocoder and a selector within the target vocoder have been allocated. This message also confirms that the target BTS has allocated a radio. Furthermore, the message contains the address of the allocated target vocoder.

The source MSC transmits a selector allocated message (540) to the source vocoder informing it that a target vocoder and a selector within the target vocoder have been allocated. This message also informs the source vocoder that the target BTS has allocated a radio. This message contains the address of the allocated target vocoder. The source vocoder stops Timer1 and verifies that the response was received in time. If the response was not received in time, the process is aborted.

Upon receiving the selector allocated message, the source vocoder transmits a hand-off direction message to the radiotelephone (545) to add the target BTS to the radiotelephone's active cell list. This message also informs the radiotelephone to begin communicating with the target BTS.

The radiotelephone transmits back to the source vocoder a hand-off completion message (550). This message indicates completion of the hand-off directions.

The radiotelephone may transmit the pilot strength measurement message to the source vocoder a second time. This indicates that the radiotelephone wishes to add another target BTS (555). In this case, the source vocoder uses the address of the target vocoder, obtained in step (540), to transmit an allocate radio message to the target selector (560). At this point, the source vocoder starts Timer1.

The allocate radio message contains multiple fields. These fields include Walsh code and pilot code of the target BTS with which the radiotelephone wishes to communicate.

The target selector passes, to the target BTS, the allocate radio message received from the source vocoder, and starts Timer2 (565). The target BTS allocates a radio resource to which the radiotelephone can communicate.

The target BTS acknowledges the allocation of a radio by sending a radio allocated message to the target vocoder (570). Upon receiving the radio allocated message, the target vocoder stops Timer2 and checks to determine if the response was received in time. In the preferred embodiment, this time is one second. Alternate embodiments use other time thresholds.

The target vocoder then passes the radio allocated message to the source vocoder (575) confirming that a radio at the target BTS was allocated. Upon receiving the radio allocated message from the target, the source vocoder stops Timer1 and verifies that the response was received in time. In the preferred embodiment, this time is 10 seconds. Alternate embodiments use other time thresholds.

The source vocoder then transmits a hand-off direction message to the radiotelephone (580) to add the target BTS to the radiotelephone's active cell list. This message informs the radiotelephone to begin communicating with the target BTS. The radiotelephone transmits back to the source vocoder a hand-off completion message (585). This message indicates the completion of the handoff directions.

In summary, by providing a faster, inter-MSC communications link through the BSC, the present invention facilitates inter-MSC soft hand-off. This provides a more reliable hand-off for the radiotelephone. The probability of a dropped call as the result of the hand-off between two MSCs is greatly reduced using the present invention. Additionally, since the existing intra-MSC hand-off signaling protocol software can be used, the present invention provides these benefits economically.

We claim:

1. A method for addressing a plurality of cellular systems, including a source cellular system, each cellular system having an area of radio coverage and comprising a plurality of entities including at least one router having a plurality of communication ports, the method comprising the steps of:

allocating at least one communications port of the plurality of communication ports for each cellular system having overlapping radio signal coverage with the source cellular system;

reserving a router address range for each communication port; and distributing the reserved router address ranges among the plurality of communication ports such that the reserved address ranges repeat in a predetermined, non-interfering pattern.

2. A cellular system that includes a source cellular system, the cellular system having an area of radio coverage, the system comprising:

at least one router having a plurality of communication ports;

a mobile switching center having means for allocating at least one communication port of the plurality of communication ports for each cellular system having overlapping radio signal coverage with the source cellular system; and means for reserving a router address range for each communication port and distributing the reserved router address ranges among the plurality of communication ports such that the reserved address ranges repeat in a predetermined, non-interfering pattern.

\* \* \* \* \*